United States Patent
Johansson et al.

(10) Patent No.: US 8,554,441 B1
(45) Date of Patent: Oct. 8, 2013

(54) PHASING OF TRACTION CONTROL BASED ON VEHICLE SPEED AND ROAD SLOPE

(71) Applicant: eAAM Driveline Systems AB, Trollhättan (SE)

(72) Inventors: Martin Johansson, Trollhättan (SE); Matilda Hallnor, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 0 days.

(21) Appl. No.: 13/799,984

(22) Filed: Mar. 13, 2013

(51) Int. Cl.
*G05D 1/00* (2006.01)

(52) U.S. Cl.
USPC ............. 701/84; 701/41; 701/532; 180/65.8; 180/233; 180/247; 180/248; 180/249; 60/650; 60/659; 60/682; 414/396; 414/401; 310/115; 475/86; 475/88; 475/231

(58) Field of Classification Search
USPC .................. 701/41, 84, 532; 180/65.8, 233, 180/247, 248, 249; 60/650, 682, 659; 414/396, 414/401; 318/190; 310/115; 475/86, 88, 475/231
See application file for complete search history.

(56) References Cited

U.S. PATENT DOCUMENTS

| | | | | |
|---|---|---|---|---|
| 4,938,306 | A | * | 7/1990 | Sumiyoshi et al. ........... 180/233 |
| 5,803,197 | A | * | 9/1998 | Hara et al. .................... 180/248 |
| 5,804,935 | A | * | 9/1998 | Radev ........................... 318/139 |
| 6,005,358 | A | * | 12/1999 | Radev ........................... 318/139 |
| 6,059,680 | A | * | 5/2000 | Yoshioka ........................ 475/88 |
| 6,166,517 | A | | 12/2000 | Wakashiro et al. |
| 6,262,491 | B1 | | 7/2001 | Kitajima et al. |
| 8,206,263 | B2 | * | 6/2012 | Tsuchikawa ................... 477/71 |
| 8,249,766 | B2 | | 8/2012 | Heap et al. |
| 8,275,503 | B2 | * | 9/2012 | Izumi ............................. 701/22 |
| 8,285,431 | B2 | | 10/2012 | Heap et al. |
| 8,285,432 | B2 | | 10/2012 | Heap et al. |
| 8,285,462 | B2 | | 10/2012 | Heap et al. |
| 8,346,449 | B2 | | 1/2013 | Heap et al. |
| 2004/0134697 | A1 | * | 7/2004 | Kobayashi et al. .......... 180/65.2 |
| 2010/0121515 | A1 | * | 5/2010 | Izumi ............................. 701/22 |
| 2010/0298092 | A1 | * | 11/2010 | Tsuchikawa ................... 477/71 |
| 2013/0041534 | A1 | | 2/2013 | Kim |

FOREIGN PATENT DOCUMENTS

| | | | |
|---|---|---|---|
| EP | 1215071 | A1 | 6/2002 |
| WO | WO-2011125084 | A1 | 10/2011 |

* cited by examiner

*Primary Examiner* — McDieunel Marc

(74) *Attorney, Agent, or Firm* — Harness, Dickey & Pierce, P.L.C.

(57) ABSTRACT

A traction control system and methodology that utilize a phase-out and phase-in of maximum drive torque and/or a regenerative brake torque based on vehicle speed and road slope.

23 Claims, 5 Drawing Sheets

PHASING OF TRACTION CONTROL BASED ON VEHICLE SPEED AND ROAD SLOPE

FIELD

The present disclosure relates to a traction control system and methodology for controlling power transmitted through a drive module. The traction control system and methodology utilize a phase-out and phase-in of maximum drive torque and/or a regenerative brake torque based on vehicle speed and road slope.

BACKGROUND

Modern higher-performance automotive vehicles are typically equipped with a system that uses various sensors to sense the vehicle's dynamics, the driver's intention and/or environmental information around the vehicle to actuate available actuators to conduct suitable control actions to help control traction and gradability performance of the vehicle, as well as energy consumption in a hybrid vehicle. While the known systems are generally effective for their intended purpose, we have noted issues that are particular to a type of vehicle having a primary driveline, which is employed to drive a first set of vehicle wheels on a full time basis, and a secondary driveline that is employed to drive a second set of vehicle wheels on a part time basis. More specifically, while it is known in the art to employ the secondary driveline to pre-emptively apply drive torque to prevent slippage of the vehicle wheels associated with the primary driveline, we have determined that the maximum torque that can be transmitted to the vehicle wheels associated with the secondary driveline should be phased-in or phased-out depending on certain circumstances involving both the terrain on which the vehicle is operating as well as certain vehicle dynamics.

SUMMARY

This section provides a general summary of the disclosure, and is not a comprehensive disclosure of its full scope or all of its features.

In one form, the present teachings provide a method for controlling transmission of power to a set of vehicle wheels. The method includes: providing a drive module for powering the set of vehicle wheels; determining a slope of a surface on which the drive module is operating; determining a speed at which the drive module is operating on the surface; determining a maximum drive torque to transmit to the set of vehicle wheels, the maximum drive torque being determined based at least partly on the determined slope and the determined speed when the determined speed is within a predetermined range of determined speeds and the determined slope is within a predetermined range of determined slopes; and transmitting power to the set of vehicle wheels such that the rotary power applied to each of the vehicle wheels of the set of vehicle wheels does not exceed the maximum drive torque.

In a further form, the present teachings provide a drive module that includes a differential assembly, an electric propulsion motor, a pair of output members, a pair of axle shafts and a controller. The electric propulsion motor is configured to drive the differential assembly. The output members at least partly driven by the differential assembly. Each axle shaft is drivingly coupled to a corresponding one of the output members. The controller controls a maximum drive torque transmitted through the axle shafts. The controller is configured to: determine a slope of a surface on which the drive module is operating; determine a speed at which the drive module is operating on the surface; determine a maximum drive torque to transmit to the set of vehicle wheels, the maximum drive torque being determined based at least partly on the determined slope and the determined speed when the determined speed is within a predetermined range of determined speeds and the determined slope is within a predetermined range of determined slopes; and control transmission of rotary power output from the drive module such that the rotary power transmitted through the axle shafts does not exceed the maximum drive torque.

In still another form, the present teachings provide a method for controlling transmission of power to a set of vehicle wheels. The method includes: providing a drive module for powering the set of vehicle wheels; determining a slope of a surface on which the drive module is operating; determining a speed at which the drive module is operating on the surface; determining a maximum regenerative braking torque to transmit to the set of vehicle wheels, the maximum regenerative braking torque being determined based at least partly on the determined slope and the determined speed when the determined speed is within a predetermined range of determined speeds and the determined slope is within a predetermined range of determined slopes; and operating an electric motor in the drive module to transmit rotary power to the set of vehicle wheels such that a regenerative braking torque applied to each of the vehicle wheels of the set of vehicle wheels does not exceed the maximum regenerative brake torque.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
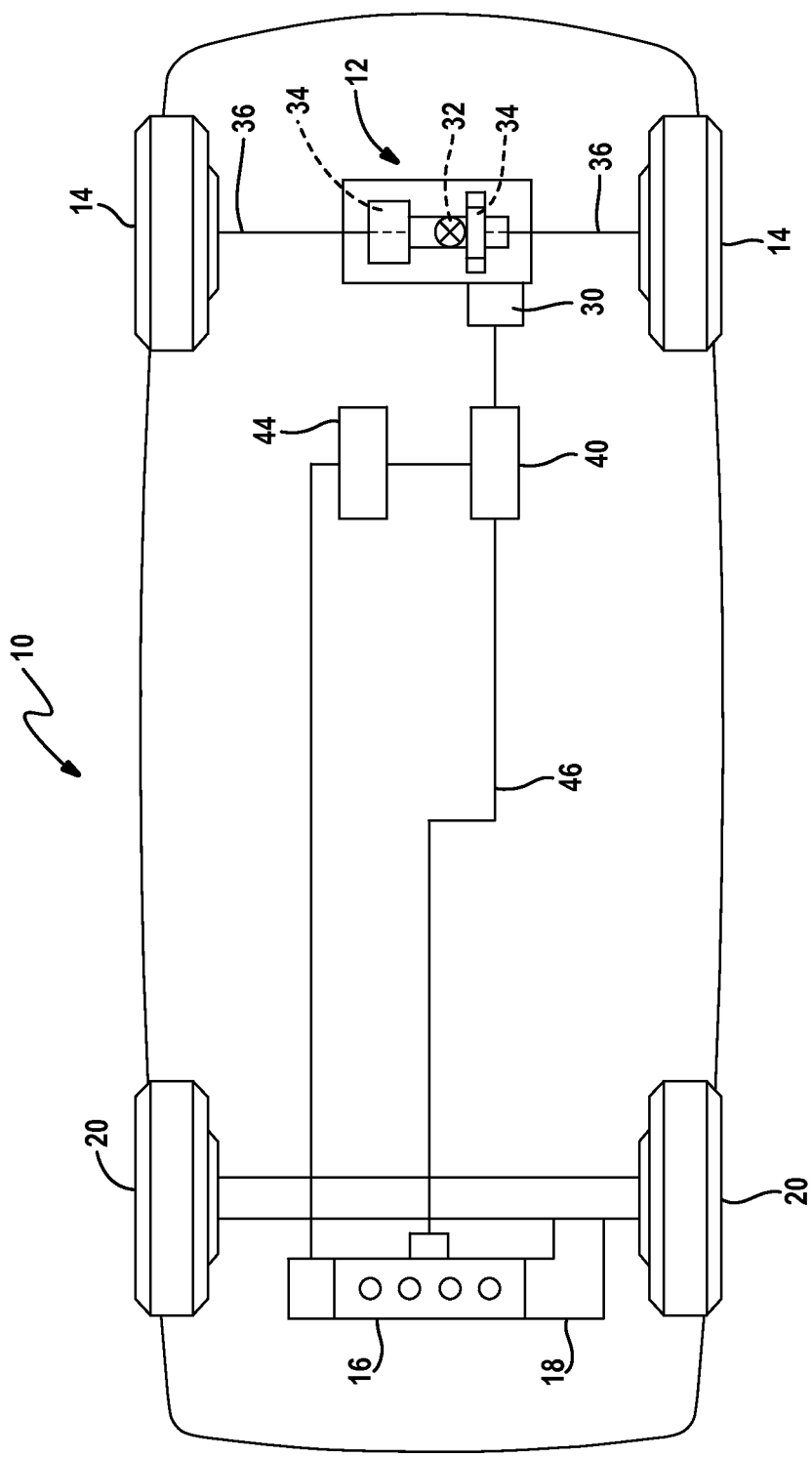
FIG. 1 is a schematic illustration of an exemplary vehicle having a drive module constructed in accordance with the teachings of the present disclosure.

With reference to FIG. 1 of the drawings, an exemplary vehicle is generally indicated by reference numeral 10 having an electric drive module 12 that is constructed in accordance with the teachings of the present disclosure. The electric drive module 12 can be employed to drive a pair of vehicle wheels 14. In the particular example provided, the drive module 12 is employed to selectively drive the rear vehicle wheels 14 (i.e., the drive module can be part of a secondary driveline that is operated on a part-time basis), while a conventional internal combustion engine 16 and transmission 18 are employed to drive a set of front vehicle wheels 20 on a full-time basis. It will be appreciated, however, that the teachings of the present disclosure have application to various diverse vehicle configurations and as such, it will be understood that the particular example discussed herein and illustrated in the appended drawings is merely exemplary. In this regard, those of skill in the art will appreciate that the teachings of the present disclosure have application to other types of vehicles that have vehicle wheels that are selectively driven.

The drive module 12 can be configured as described in co-pending U.S. application Ser. No. 13/182,153, the disclosure of which is incorporated by reference as if fully set forth in detail herein. Briefly, the drive module 12 can include an electric propulsion motor 30 that is employed to drive a differential assembly 32, and a pair of output members 34 that are at least partly driven by the differential assembly 32 and which drive corresponding axle shafts 36 to thereby drive the rear vehicle wheels 14. The drive module 12 can further include a controller 40 that can be configured to control operation of the drive module 12. The controller 40 can be coupled to the propulsion motor 30, a source of electricity (e.g., batteries 44), and a vehicle data network 46. The vehicle data network 46 can be any type of system or network for transmitting vehicle data within the vehicle 10, such as a controller area network (CAN) or a local interconnect network (LIN). The batteries 44 can be any type of battery and can be recharged, for example, via an alternator, a generator and/or regenerative braking. As used herein, the term controller refers to an application specific integrated circuit (ASIC), an electronic circuit, a processor (shared, dedicated or group) and memory that executes one or more software or firmware programs, a combinational logic circuit, or other suitable components that provide the described functionality. The controller 40 can receive data from the vehicle data network—that pertains to: a) present vehicle dynamics, including the speed of the vehicle 10; b) the surface (e.g., road surface) on which the vehicle 10 is operating; c) driver input to control the vehicle 10; and d) the environment in which the vehicle 10 is operating. The controller 40 can employ the data received from the vehicle data network 46 to control the operation of the drive module 12 to thereby regulate the torque that is transmitted to the rear vehicle wheels 14.

For example, the controller 40 can be operated in an all-wheel drive, pre-emptive mode in which the drive module 12 is operated to preemptively apply torque to the rear vehicle wheels 14 to prevent slippage of the front vehicle wheels 20. Operation of the controller 40 in the pre-emptive mode may be particularly advantageous in situations where the vehicle 10 will need to accelerate from an almost still or zero velocity condition or accelerate when the vehicle 10 is operated in certain situations, such as low friction surfaces, soft surfaces or road inclinations.

Figure 2:
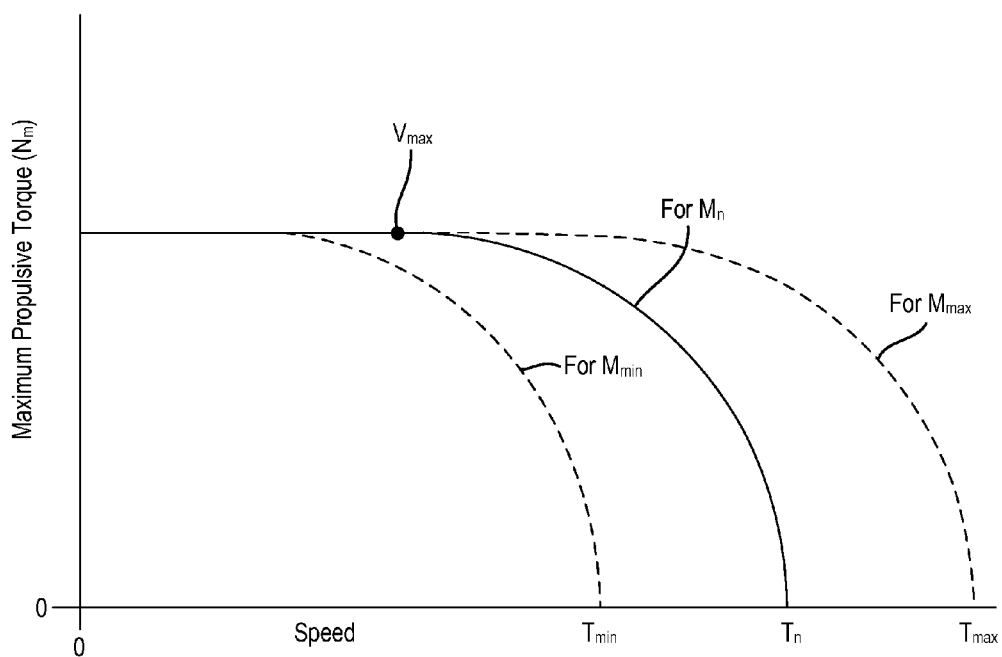
FIGS. 2 and 3 are plots illustrating the effect of a relationship between transition speed ($T_n$) and slope (M) on a maximum propulsive torque provided by a drive module in accordance with the teachings of the present disclosure.

With additional reference to FIG. 2, the controller 40 can be configured to control operation of one or more elements within the drive module 12 (e.g., the propulsion motor 30) such that a maximum drive torque that is transmitted to the rear vehicle wheels 14 in the pre-emptive mode is determined based partly on the slope ($m_n$) of the surface on which the vehicle 10 is operating and a speed ($s_n$) of the vehicle 10, provided that the slope ($m_n$) and speed ($s_n$) of the vehicle are within predetermined first ranges (i.e., $m_{min} \leq m_n \leq m_{max}$ and $s_{min} \leq s_n \leq s_{max}$). More specifically, the controller 40 can be configured to limit the torque that is output by the drive module 12 to the rear vehicle wheels 14 (i.e., the maximum drive torque) based on the speed ($s_n$) of the vehicle 10 (provided that the speed ($s_n$) of the vehicle 10 is within a predetermined first range of speeds ($s_{min} \leq s_n \leq s_{max}$)) and can change the maximum drive torque for a given vehicle speed ($s_n$) depending on the slope ($m_n$) of the surface on which the vehicle 10 is operating (provided that the vehicle speed and the slope are within their respective predefined first ranges (i.e., $s_{min} \leq s_n \leq s_{max}$ and $m_{min} \leq m_n \leq m_{max}$)).

The maximum drive torque can be set to a predetermined minimum value, such as zero (0) newton-meters, when the vehicle speed is greater than the predetermined first range of determined speeds (i.e., when $s_n > s_{max}$).

Each slope ($m_n$) within the predetermined first range of slopes ($m_{min} \leq m_n \leq m_{max}$) can be associated with a transition speed ($T_n$) at which the maximum drive torque is equal to zero (0) newton-meters. The transition speed ($T_n$) can be thought of as a point at which the controller 40 has phased-out auxiliary power to the rear vehicle wheels 14 if the vehicle 10 is operated at or above the transition speed ($T_n$). The transition speed ($T_n$) can also be thought of as a point at which the controller 40 phases-in auxiliary power to the rear vehicle wheels 14 if the vehicle 10 is operated at or below the transition speed ($T_n$). The transition speed ($T_n$) can increase as the slope ($m_n$) increases within the predetermined first range of determined slopes ($m_{min} \leq m_n \leq m_{max}$) if the vehicle 10 is ascending the slope. Similarly, the transition speed ($T_n$) can decrease as the slope ($m_n$) increases within the predetermined first range of determined slopes ($m_{min} \leq m_n \leq m_{max}$) if the vehicle 10 is descending the slope.

Figure 3:
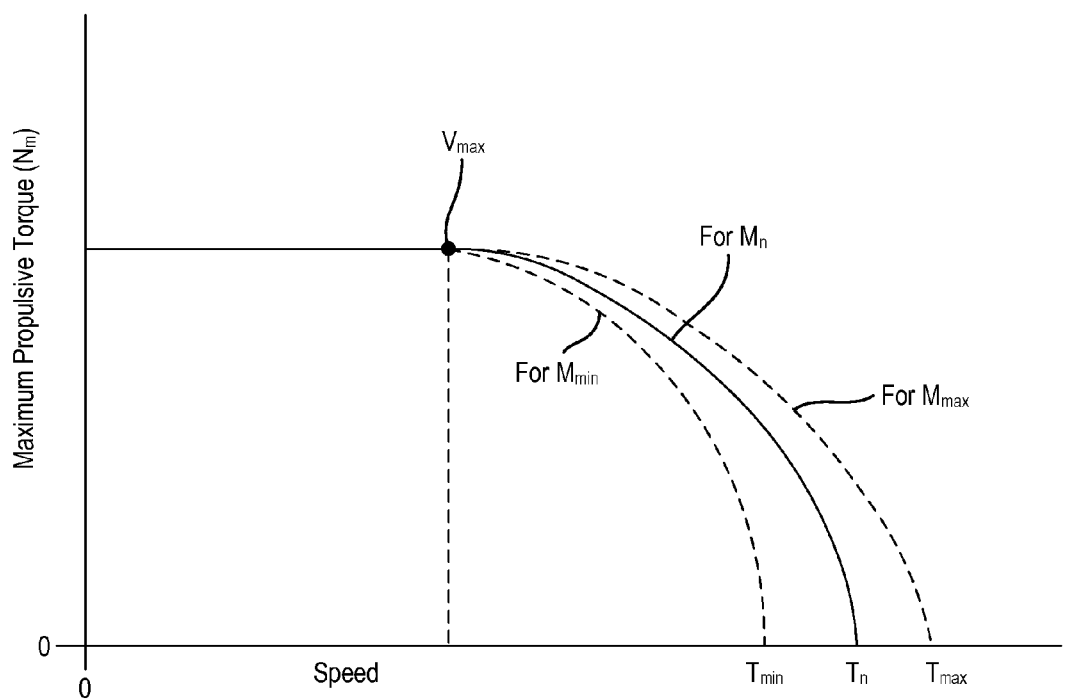

In the particular example provided, a transition in torque between a maximum value ($V_{max}$) of the maximum drive torque and the transition speed ($T_n$) is identical for each slope ($m_n$) within the predetermined range of slopes ($m_{min} \leq m_n \leq m_{max}$). Alternatively, the transition in torque between the maximum value ($V_{max}$) of the maximum drive torque and the transition speed ($T_n$) can become more gradual as the slope ($m_n$) increases within the predetermined range of slopes ($m_{min} \leq m_n \leq m_{max}$) as is shown in FIG. 3. In the example of FIG. 3, the transition in torque from the maximum value ($V_{max}$) of the maximum drive torque occurs at a predetermined transition speed ($s_t$) for all slopes within the predetermined range of slopes ($m_{min} \leq m_n \leq m_{max}$).

With renewed reference to FIGS. 1 and 2, it will be appreciated that the speed ($s_n$) of the vehicle 10 can be determined in various different manners. For example, the speed ($s_n$) of the vehicle can be obtained directly from the vehicle data network 46 or could be calculated by the controller 40 based (in whole or in part) on the rotational speed of an element in the drive module 12, such as output shaft of the propulsion motor 30, one or more of the output members 34 and/or one or more of the axle shafts 36.

It will also be appreciated that the slope ($m_n$) of the surface on which the vehicle 10 is operating can be determined in various different manners. For example, the slope ($m_n$) can be obtained from a sensor (e.g., a sensor that is configured to sense the pitch of the vehicle 10 and responsively generate a sensor signal) or calculated based on information obtained from GPS signals.

The maximum drive torque can be determined via any desired means, such as a calculation or a look-up table.

We have determined that it is also possible to phase in or out a regenerative braking torque applied by the drive module 12 to the rear vehicle wheels 14 based at least in part on the slope ($m_n$) of the surface on which the vehicle 10 is operating and a speed ($s_n$) of the vehicle 10.

Figure 4:
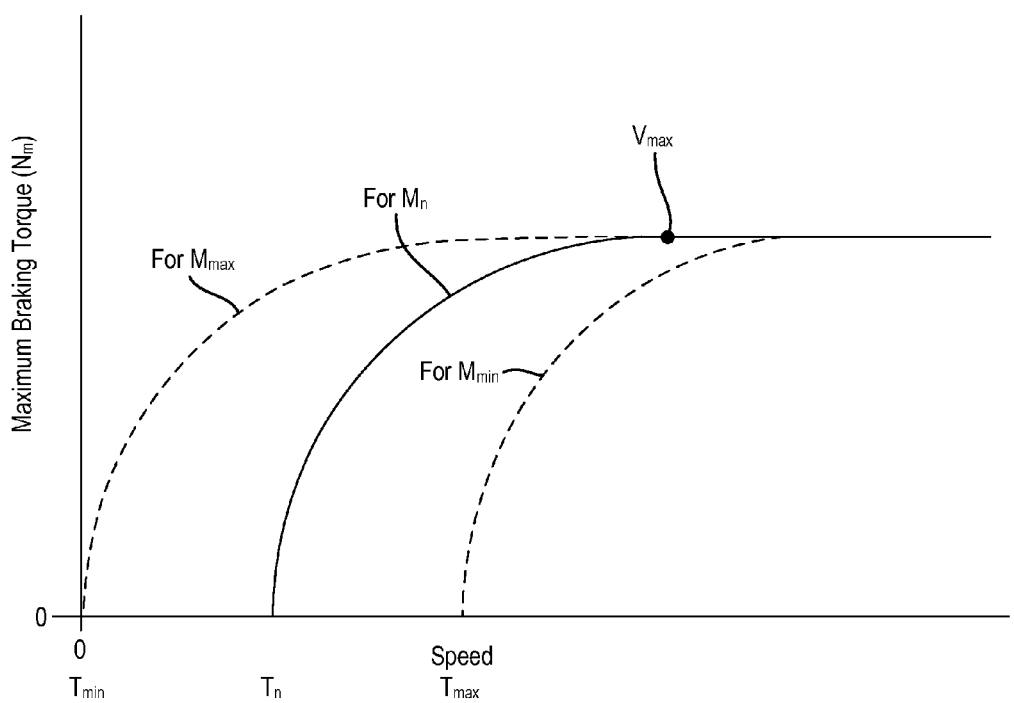
FIG. 4 is a plot illustrating the effect of a relationship between transition speed ($T_n$) and slope (M) on a maximum regenerative braking torque provided by a drive module in accordance with the teachings of the present disclosure.

With reference to FIGS. 1 and 4, the controller 40 can be configured to control operation of one or more elements within the drive module 12 (e.g., the propulsion motor 30)

such that a maximum regenerative braking torque that is transmitted to the rear vehicle wheels 14 in a braking mode is determined based partly on the slope ($m_n$) of the surface on which the vehicle 10 is operating and a speed ($s_n$) of the vehicle 10, provided that the slope ($m_n$) and speed ($s_n$) of the vehicle are within predetermined ranges. More specifically, the controller 40 can be configured to limit the regenerative braking torque that is output by the drive module 12 to the rear vehicle wheels 14 (i.e., the maximum regenerative braking torque) based on the speed ($s_n$) of the vehicle 10 (provided that the speed ($s_n$) of the vehicle 10 is within a predetermined second range of speeds and can change the maximum regenerative braking torque for a given vehicle speed ($s_n$) depending on the slope ($m_n$) of the surface on which the vehicle 10 is operating (provided that the vehicle speed and the slope are within their respective predefined (second) ranges. It will be appreciated that the predetermined second range of the slope ($m_n$) need not be equal to the predetermined first range of the slope ($m_n$) employed for determining the maximum drive torque, and/or that the predetermined second range of the vehicle speed ($s_n$) need not be equal to the predetermined first range of the vehicle speed ($s_n$) employed for determining the maximum drive torque.

The maximum regenerative brake torque can be set to a predetermined minimum value, such as zero (0) newton-meters, when the vehicle speed is smaller than the predetermined range of determined speeds (i.e., when $s_n < s_{min}$).

Each slope ($m_n$) within the predetermined second range of slopes ($m_{min} \leq m_n \leq m_{max}$) can be associated with a transition speed ($T_n$) at which the maximum regenerative brake torque is equal to the predetermined minimum brake torque, such as zero (0) newton-meters. The transition speed ($T_n$) can be thought of as a point at which the controller 40 has phased-out to a maximum extent regenerative braking at the rear vehicle wheels 14 if the vehicle 10 is operated at or below the transition speed ($T_n$). The transition speed ($T_n$) can also be thought of as a point at which the controller 40 phases-in regenerative braking at the rear vehicle wheels 14 if the vehicle 10 is operated at or above the transition speed ($T_n$). The transition speed ($T_n$) can increase as the slope ($m_n$) increases within the predetermined second range of determined slopes ($m_{min} \leq m_n \leq m_{max}$) if the vehicle 10 is ascending the slope. Similarly, the transition speed ($T_n$) can decrease as the slope ($m_n$) increases within the predetermined second range of determined slopes ($m_{min} \leq m_n \leq m_{max}$) if the vehicle 10 is descending the slope.

Figure 5:
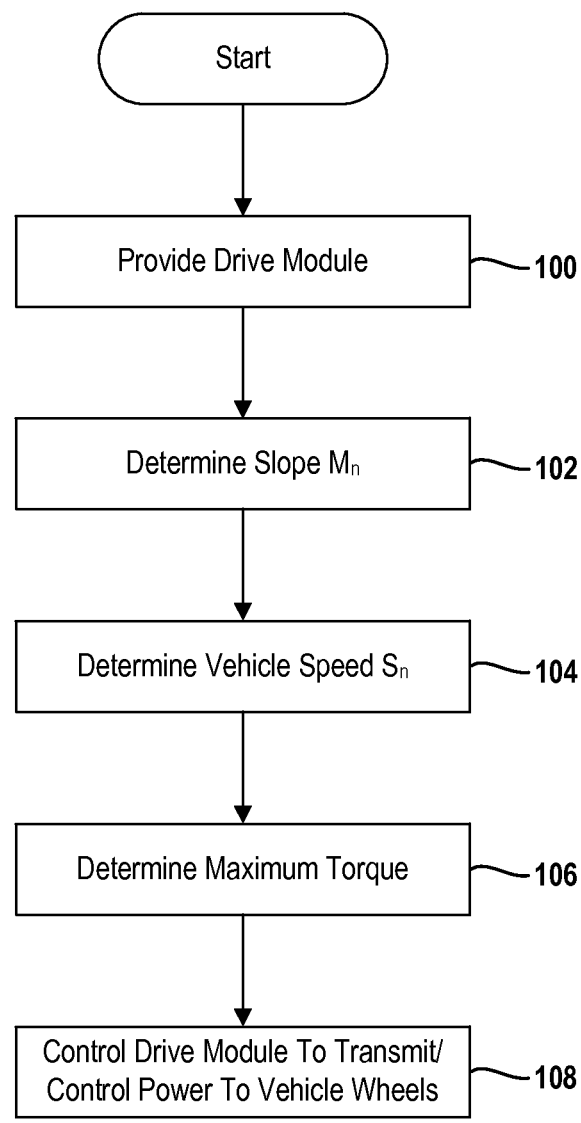
FIG. 5 is a schematic illustration in flow chart form of a methodology according to the teachings of the present disclosure.

In FIG. 5, a method is schematically illustrated for controlling transmission of power to a set of vehicle wheels according to the teachings of the present disclosure. Control can proceed to block 100 where a drive module for powering the set of vehicle wheels is provided. Control can proceed to block 102 where control can determine a slope of a surface on which the drive module is operating. Control can proceed to block 104, where control can determine a speed at which the drive module is operating on the surface. Control can proceed to block 106, where control can determine a) a maximum drive torque to transmit to the set of vehicle wheels and/or b) a maximum regenerative brake torque. If the maximum drive torque is determined, it can be determined at least partly on the determined slope and the determined speed when the determined speed is within a predetermined first range of determined speeds and the determined slope is within a predetermined first range of determined slopes. Similarly, if the maximum regenerative brake torque is determined, it can be determined at least partly based on the determined slope and the determined speed when the determined speed is within a predetermined second range of determined speeds and the determined slope is within a predetermined second range of determined slopes. As noted above, the predetermined first range of determined speeds may be equal to or different from the predetermined second range of determined speeds, and/or the predetermined first range of determined slopes may be equal to or different from the predetermined second range of determined slopes. Control can proceed to block 108 where control can operate elements of the drive module, such as the propulsion motor, to transmit or control power to the set of vehicle wheels. For example, the propulsion motor of the drive module can be controlled to transmit power to the set of vehicle wheels such that the rotary power applied to each of the vehicle wheels in the set of vehicle wheels does not exceed the maximum drive torque. As another example, the propulsion motor of the drive module can be controlled to transmit power to the set of vehicle wheels such that a regenerative brake torque applied to each of the vehicle wheels in the set of vehicle wheels does not exceed the maximum regenerative brake torque.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling transmission of power to a set of vehicle wheels, the method comprising:
providing a drive module for powering the set of vehicle wheels;
determining by a processor a slope of a surface on which the drive module is operating;
determining by the processor a speed at which the drive module is operating on the surface;
determining by the processor a maximum drive torque to transmit to the set of vehicle wheels, the maximum drive torque being determined based at least partly on the determined slope and the determined speed when the determined speed is within a predetermined range of determined speeds and the determined slope is within a predetermined range of determined slopes; and
transmitting power to the set of vehicle wheels such that the rotary power applied to each of the vehicle wheels of the set of vehicle wheels does not exceed the maximum drive torque.

2. The method of claim 1, wherein the maximum drive torque is set to a predetermined minimum value when the determined speed is greater than the predetermined range of determined speeds.

3. The method of claim 2, wherein the predetermined minimum value is zero (0) newton-meters.

4. The method of claim 1, wherein a transition speed ($T_n$) at which the maximum drive torque drops to zero (0) newton-meters increases as the determined slope increases within the predetermined range of determined slopes.

5. The method of claim 4, wherein for each determined slope within the predetermined range of determined slopes, a transition in torque between a maximum value of the maximum drive torque and the transition speed ($T_n$) is identical.

6. The method of claim 4, a transition in torque between a maximum value of the maximum drive torque and the transition speed ($T_n$) becomes more gradual as the determined slope increases within the predetermined range of determined slopes.

7. The method of claim 4, wherein for all determined slopes within the predetermined range of slopes, a transition from a maximum value of the maximum drive torque occurs at a predetermined transition speed.

8. A controller for a drive module that is configured to drive a pair of vehicle wheels, the controller being configured to:
   determine a slope of a surface on which the drive module is operating;
   determine a speed at which the drive module is operating on the surface;
   determine a maximum drive torque to transmit to the set of vehicle wheels, the maximum drive torque being determined based at least partly on the determined slope and the determined speed when the determined speed is within a predetermined range of determined speeds and the determined slope is within a predetermined range of determined slopes; and
   control transmission of rotary power output from the drive module such that the rotary power output from the drive module does not exceed the maximum drive torque.

9. A drive module comprising:
   a differential assembly;
   an electric propulsion motor that is configured to drive the differential assembly;
   a pair of output members at least partly driven by the differential assembly;
   a pair of axle shafts, each axle shaft being drivingly coupled to a corresponding one of the output members; and
   a controller for controlling a maximum drive torque transmitted through the axle shafts, the controller being configured to determine a slope of a surface on which the drive module is operating; determine a speed at which the drive module is operating on the surface; determine a maximum drive torque to transmit to the set of vehicle wheels, the maximum drive torque being determined based at least partly on the determined slope and the determined speed when the determined speed is within a predetermined range of determined speeds and the determined slope is within a predetermined range of determined slopes; and control transmission of rotary power output from the drive module such that the rotary power transmitted through the axle shafts does not exceed the maximum drive torque.

10. The drive module of claim 9, wherein the maximum drive torque is set by the controller to a predetermined minimum value when the determined speed is greater than the predetermined range of determined speeds.

11. The drive module of claim 10, wherein the predetermined minimum value is zero (0) newton-meters.

12. The drive module of claim 9, wherein a transition speed ($T_n$) at which the maximum drive torque drops to zero (0) newton-meters increases as the determined slope increases within the predetermined range of determined slopes.

13. The drive module of claim 12, wherein for each determined slope within the predetermined range of determined slopes, a transition in torque between a maximum value of the maximum drive torque and the transition speed ($T_n$) is identical.

14. The drive module of claim 12, a transition in torque between a maximum value of the maximum drive torque and the transition speed ($T_n$) becomes more gradual as the determined slope increases within the predetermined range of determined slopes.

15. The drive module of claim 12, wherein for all determined slopes within the predetermined range of slopes, a transition from a maximum value of the maximum drive torque occurs at a predetermined transition speed.

16. A method for controlling transmission of power to a set of vehicle wheels, the method comprising:
   providing a drive module for powering the set of vehicle wheels;
   determining by a processor a slope of a surface on which the drive module is operating;
   determining by the processor a speed at which the drive module is operating on the surface;
   determining by the processor a maximum regenerative braking torque to transmit to the set of vehicle wheels, the maximum regenerative braking torque being determined based at least partly on the determined slope and the determined speed when the determined speed is within a predetermined range of determined speeds and the determined slope is within a predetermined range of determined slopes; and
   operating an electric motor in the drive module to transmit rotary power to the set of vehicle wheels such that a regenerative braking torque applied to each of the vehicle wheels of the set of vehicle wheels does not exceed the maximum regenerative brake torque.

17. The method of claim 16, wherein the maximum regenerative brake torque is set to a predetermined minimum value when the determined speed is smaller than the predetermined range of determined speeds.

18. The method of claim 17, wherein the predetermined minimum value is zero (0) newton-meters.

19. The method of claim 16, wherein a transition speed ($T_n$) at which the maximum regenerative brake torque drops to zero (0) newton-meters increases as the determined slope increases within the predetermined range of determined slopes.

20. The method of claim 19, wherein for each determined slope within the predetermined range of determined slopes, a transition in torque between a maximum value of the maximum drive torque and the transition speed ($T_n$) is identical.

21. The method of claim 19, a transition in torque between a maximum value of the maximum regenerative brake torque and the transition speed ($T_n$) becomes more gradual as the determined slope increases within the predetermined range of determined slopes.

22. The method of claim 19, wherein for all determined slopes within the predetermined range of slopes, a transition from a maximum value of the maximum regenerative brake torque occurs at a predetermined transition speed.

23. The method of claim 16, wherein the transition speed ($T_n$) at which the maximum regenerative brake torque drops to zero (0) newton-meters decreases as the determined slope increases within the predetermined range of determined slopes.

* * * * *

UNITED STATES PATENT AND TRADEMARK OFFICE
CERTIFICATE OF CORRECTION

PATENT NO. : 8,554,441 B1  
APPLICATION NO. : 13/799984  
DATED : October 8, 2013  
INVENTOR(S) : Johansson et al.

Page 1 of 1

It is certified that error appears in the above-identified patent and that said Letters Patent is hereby corrected as shown below:

In the Drawings

Fig. 2, Drawing Sheet 2/5, "$M_n$", should be --$m_n$--

Fig. 2, Drawing Sheet 2/5, "$M_{min}$", should be --$m_{min}$--

Fig. 2, Drawing Sheet 2/5, "$M_{max}$", should be --$m_{max}$--

Fig. 3, Drawing Sheet 3/5, "$M_n$", should be --$m_n$--

Fig. 3, Drawing Sheet 3/5, "$M_{min}$", should be --$m_{min}$--

Fig. 3, Drawing Sheet 3/5, "$M_{max}$", should be --$m_{max}$--

Fig. 4, Drawing Sheet 4/5, "$M_n$", should be --$m_n$--

Fig. 4, Drawing Sheet 4/5, "$M_{min}$", should be --$m_{min}$--

Fig. 4, Drawing Sheet 4/5, "$M_{max}$", should be --$m_{max}$--

Fig. 5, Drawing Sheet 5/5, "$M_n$", should be --$m_n$--

Fig. 5, Drawing Sheet 5/5, "$S_n$", should be --$s_n$--

In the Specification

Column 5, Line 12, "speeds", should be --speeds)--

Column 5, Line 16, "ranges", should be --ranges)--

Signed and Sealed this  
Twenty-third Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO.      : 8,554,441 B1
APPLICATION NO. : 13/799984
DATED           : October 8, 2013
INVENTOR(S)     : Johansson et al.

It is certified that error appears in the above-identified patent and that said Letters Patent is hereby corrected as shown below:

On the title page, in the illustrative figure "$M_n$", should be --$m_n$--

On the title page, in the illustrative figure "$S_n$", should be --$s_n$--

In the Drawings

Fig. 2, Drawing Sheet 2/5, "$M_n$", should be --$m_n$--

Fig. 2, Drawing Sheet 2/5, "$M_{min}$", should be --$m_{min}$--

Fig. 2, Drawing Sheet 2/5, "$M_{max}$", should be --$m_{max}$--

Fig. 3, Drawing Sheet 3/5, "$M_n$", should be --$m_n$--

Fig. 3, Drawing Sheet 3/5, "$M_{min}$", should be --$m_{min}$--

Fig. 3, Drawing Sheet 3/5, "$M_{max}$", should be --$m_{max}$--

Fig. 4, Drawing Sheet 4/5, "$M_n$", should be --$m_n$--

Fig. 4, Drawing Sheet 4/5, "$M_{min}$", should be --$m_{min}$--

Fig. 4, Drawing Sheet 4/5, "$M_{max}$", should be --$m_{max}$--

Fig. 5, Drawing Sheet 5/5, "$M_n$", should be --$m_n$--

Fig. 5, Drawing Sheet 5/5, "$S_n$", should be --$s_n$--

This certificate supersedes the Certificate of Correction issued September 23, 2014.

Signed and Sealed this
Fourteenth Day of October, 2014

Michelle K. Lee
*Deputy Director of the United States Patent and Trademark Office*

CERTIFICATE OF CORRECTION (continued)
U.S. Pat. No. 8,554,441 B1

In the Specification

Column 5, Line 12, "speeds", should be --speeds)--

Column 5, Line 16, "ranges", should be --ranges)--